United States Patent [19]
Alber et al.

[11] Patent Number: 5,927,151
[45] Date of Patent: Jul. 27, 1999

[54] SHIFT DEVICE FOR A CHANGE SPEED TRANSMISSION OF A MOTOR VEHICLE

[75] Inventors: Heinz Alber, Leinfelden-Echterdingen; Friedrich Duckeck, Reutlingen; Güter Wörner, Kernen, all of Germany

[73] Assignee: Daimler-Benz Aktiengesellschaft, Stuttgart, Germany

[21] Appl. No.: 08/926,033

[22] Filed: Sep. 9, 1997

[30] Foreign Application Priority Data

Sep. 9, 1996 [DE] Germany ............................ 196 36 506

[51] Int. Cl.[6] ...................................................... B60K 20/00
[52] U.S. Cl. .................. 74/473.3; 74/473.29; 74/473.34
[58] Field of Search ............................. 74/473.25, 473.3, 74/473.29, 473.35, 473.36, 473.34

[56] References Cited

U.S. PATENT DOCUMENTS

| | | | |
|---|---|---|---|
| 4,086,822 | 5/1978 | Kuroda ................................. | 74/473.29 |
| 4,355,543 | 10/1982 | Ikemoto et al. ...................... | 74/473.29 |
| 4,458,549 | 7/1984 | Tani et al. ............................. | 74/473.3 |
| 4,524,633 | 6/1985 | Murata et al. ................... | 74/473.29 X |
| 4,742,724 | 5/1988 | Jimbo et al. ...................... | 74/473.3 X |
| 5,187,998 | 2/1993 | Asano et al. ..................... | 74/473.3 X |
| 5,263,385 | 11/1993 | Hirata et al. ..................... | 74/473.3 X |

FOREIGN PATENT DOCUMENTS

| | | |
|---|---|---|
| 0579532 | 1/1994 | European Pat. Off. . |
| 2008471 | 1/1970 | France . |
| 4231248 | 8/1993 | Germany . |
| 4427076 | 1/1996 | Germany . |
| 2027115 | 2/1980 | United Kingdom . |

OTHER PUBLICATIONS

Patent Abstracts of Japan, 07071569, Published Mar. 17, 1995, Manual Transmission for Vehicle.

*Primary Examiner*—John A. Jeffery
*Assistant Examiner*—Marcus Charles
*Attorney, Agent, or Firm*—Evenson, McKeown, Edwards & Lenahan, P.L.L.C.

[57] ABSTRACT

In a shift device for a gear-change transmission of a motor vehicle, to reduce force peaks of the manual shifting forces for the kinematic connection between a manual shift lever and a shift lever fixed in terms of rotation relative to a gear-shift shaft, the kinematic connection being used for engaging and disengaging the gears includes an additional mass increasing the mass moment of inertia of the gear-shift shaft and damping members lying in the force flux of the shifting force are provided.

17 Claims, 4 Drawing Sheets

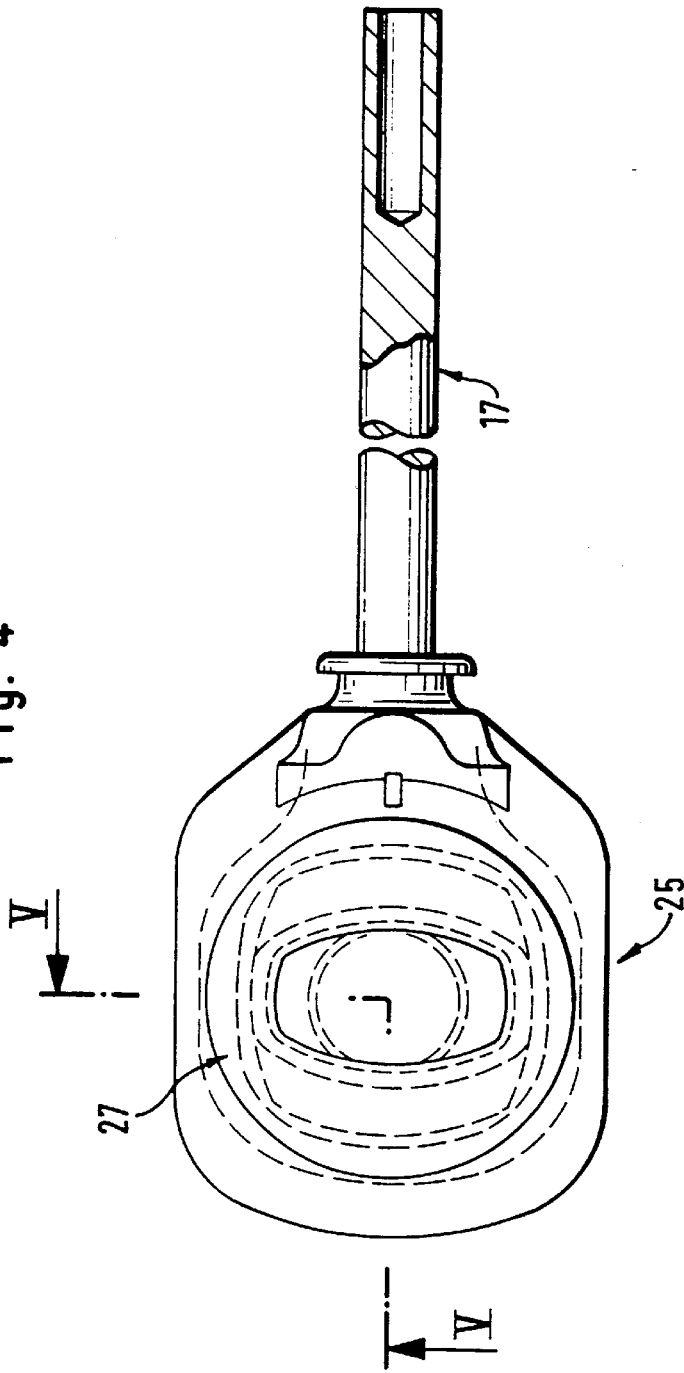

SHIFT DEVICE FOR A CHANGE SPEED TRANSMISSION OF A MOTOR VEHICLE

BACKGROUND AND SUMMARY OF THE INVENTION

This application claims the priority of German application 196 36 506.6 filed in Germany on Sep. 9, 1996, the disclosure of which is expressly incorporated by reference herein.

The invention relates to a shift device for a gear-change transmission of a motor vehicle, comprising: a gear-shift shaft which is arranged in a gear-shift housing so as to be rotatable and axially displaceable, a shift lever which is fixed in terms of rotation relative to the gear-shift shaft and which is kinematically connected to a manual shift lever, and an additional mass which acts on the shift lever and which increases the mass moment of inertia of the gear-shift shaft in such a way that force peaks of the shifting force which is measurable on the manual shift lever are reduced during individual shifting operations.

A known gear-shift apparatus for motor vehicles (German Patent Document DE 38 39 319 C2), which corresponds to the shift device of the type mentioned in the introduction, makes use of a cab unit for receiving the shift commands of a shift lever, which is pivotable about two axes perpendicular to one another, of a transmission unit, mounted on the transmission, for sending the shift commands to the transmission and of shift cables which connect the cab unit to the transmission unit and transfer the shifting movement from the cab unit to the transmission unit, a shift-gate slot being selected by the transmission unit during a pivoting movement of the shift lever about one axis and an engaging movement for the engaging of a shift clutch being executed by the transmission unit during a pivoting movement of the shift lever about the other axis, and there being coupled to a transmission unit component executing the shifting movement a moveable actuating element, to which the shifting movement is transferred. In order to provide a gear-shift apparatus which is distinguished by an agreeable gear-shift feeling similar to that of a shift linkage, the actuating element is designed as a mass body having a mass such that, due to its inertia, it opposes appreciable resistance to the engaging movement in the initial phase of the latter and, in the end phase of the latter, by virtue of its angular momentum, appreciably assists the engaging movement and thereby partially compensates the elastic behavior of the shift cable.

German Patent Document DE 39 32 815 C2 discloses a force transfer joint for the shift linkage of a motor vehicle transmission, the joint consisting of a cardan joint cage, with a recess for the rotationally fixed mounting of a sliding block, secured therein by means of a holding member, for receiving a pin of a shift rod, of elastomeric dampers between the sliding block and the recess in the shifting directions and of a non-damped mounting of the sliding block in the recess in the selection directions. In order to avoid selection play in the selection direction and make cost-effective manufacture possible, a design is adopted to the effect that the cardan joint cage has a rectangular recess with two parallel faces and, for the selection directions, two wedge faces for receiving the correspondingly designed sliding block, a self-adjusting holding means being provided for the sliding block on the cardan joint cage.

The subject of German Patent Document DE 195 23 141 A1, not previously published, is a shift device for a gear-change transmission of a motor vehicle, with a gear-shift shaft which is arranged in a gear-shift housing so as to be rotatable and axially displaceable and which has a shift lever which is fixed in terms of rotation relative to the gear-shift shaft and which is kinematically connected to a manual shift lever, and with an additional mass which acts on the shift lever and which increases the mass moment of inertia of the gear-shift shaft in such a way that force peaks of the shifting force which is measurable on the manual shift lever are reduced during individual shifting operations. The additional mass is separately mounted pivotably relative to a housing part and is connected in transmission terms to the shift lever. The pivot-bearing axis lies parallel to the axis of rotation of the gear-shift shaft.

An object on which the invention is based consists, essentially, in a shift device of the type mentioned in the introduction, to improve further the reduction in the force peaks occurring during the shifting operation.

According to certain preferred embodiments of the invention, this object is advantageously achieved by providing a shift device for a gear-change transmission of a motor vehicle, comprising:

a gear-shift shaft which is arranged in a gear-shift housing so as to be rotatable and axially displaceable, a shift lever which is fixed in terms of rotation relative to the gear-shift shaft and which is kinematically connected to a manual shift lever, and an additional mass which acts on the shift lever and which increases the mass moment of inertia of the gear-shift shaft in such a way that force peaks of the shifting force which is measurable on the manual shift lever are reduced during individual shifting operations, wherein the kinematic connection between the shift lever and the manual shift lever has a joint with a joint half assigned as part of the connection to the shift lever and with a joint half assigned as a further part of the connection to a linkage leading to the manual shift lever, and wherein one joint half is operatively connected to that part of the connection assigned to it by means of an elastic damping member lying in the force flux of the shifting forces.

According to certain preferred embodiments of the invention, this object is advantageously achieved by providing a shift device for a gear-change transmission of a motor vehicle, comprising:

a gear-shift shaft which is arranged in a gear-shift housing so as to be rotatable and axially displaceable, a shift lever which is fixed in terms of rotation relative to the gear-shift shaft and which is kinematically connected to a manual shift lever, and an additional mass which acts on the shift lever and which increases the mass moment of inertia of the gear-shift shaft in such a way that force peaks of the shifting force which is measurable on the manual shift lever are reduced during individual shifting operations, the additional mass being connected to the gear-shift shaft, and being arranged in such a way that only the engaging movement is transferred to it, wherein the additional mass is arranged on a boom which is mounted pivotably on a housing part of the gear-shift housing at a distance from the axis of rotation of the gear-shift shaft and which is connected in transmission terms to the shift lever, wherein the pivot-bearing axis of the boom lies parallel to the axis of rotation of the gear-shift shaft, wherein the kinematic connection between the shift lever and the manual shift lever has a joint with a joint half assigned as part of the connection to the shift lever and with a joint half assigned as a further part of the connection to a linkage leading to the manual shift lever, and wherein one joint half is operatively connected to that part of the connection assigned to it by means of an elastic damping member lying in the force flux of the shifting forces.

In the shift devices of the invention, both the force amplitude (the servo effect of the action of mass) and the force peaks otherwise detectable during gear shifting are reduced as a result of the influence of the additional mass. In addition, the force peaks generated during gear shifting are also eliminated by means of the elastic damping member or damping members.

Furthermore, in the shift device of the invention according to certain preferred embodiments, the dynamic effect of the additional mass is both reinforced and reliably uncoupled from the selection movements of the shift device.

In the shift devices of the invention, an optimum profile for gear-shift comfort is achieved as a result of the combination of the additional mass and damping members, as can be felt on the manual shift lever. In physical terms, the arrangement of the additional mass and damping member on the shift lever of the gear-shift shaft signifies a state in which the force effect of the mass through elasticity avoids reactions on the shift lever (force fluctuations). That is to say, the lower force fluctuations on the shift lever which have occurred during the shifting sequence can no longer be detected. This effect is also reinforced by the additional damping member in the design of the shift device of the invention according to certain preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 4 shows a joint with an elastic damping member for the kinematic connection of the manual shift lever to a shift linkage leading to the transmission-side part of the shift device of FIG. 2, and FIG. 5 shows a section through the joint of FIG. 4 along the line V—V.

DETAILED DESCRIPTION OF THE DRAWINGS

Figure 1:
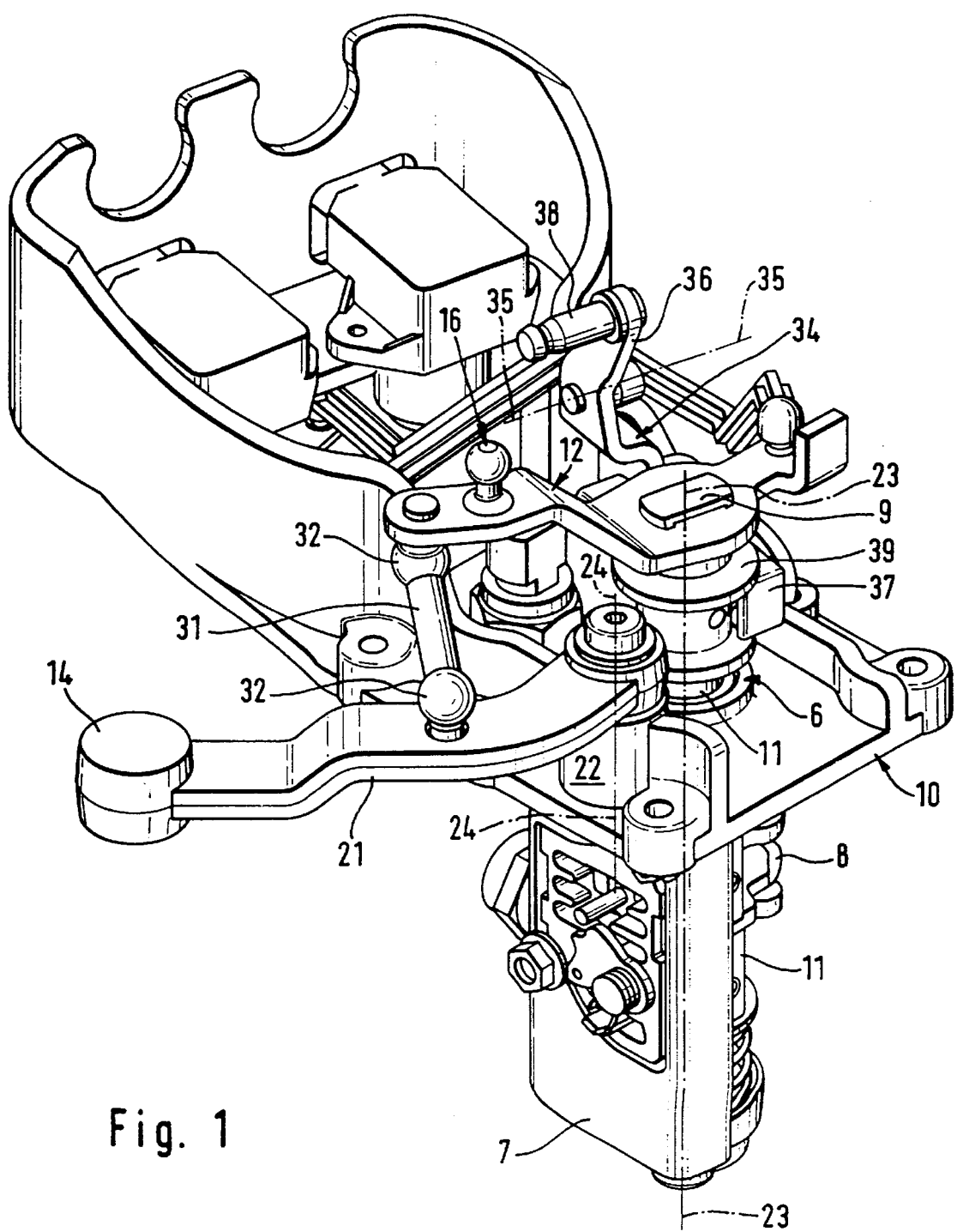
FIG. 1 shows a perspective illustration of a transmission-side part of a shift device of the invention in a partly assembled state without damping members.
Figure 2:
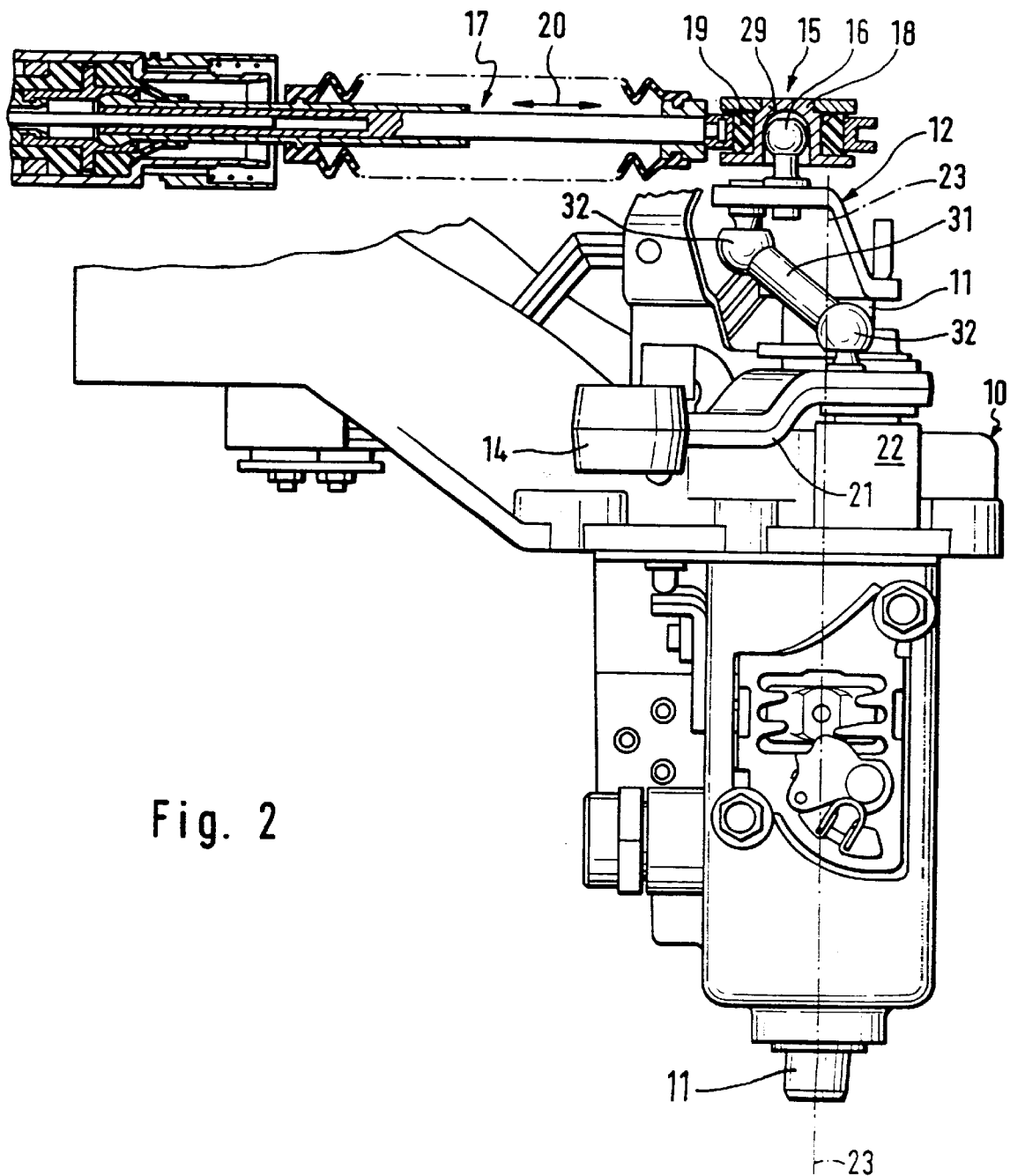
FIG. 2 shows a side view of the shift device of FIG. 1 in a state made more complete by a shift linkage having a damping member.
Figure 3:
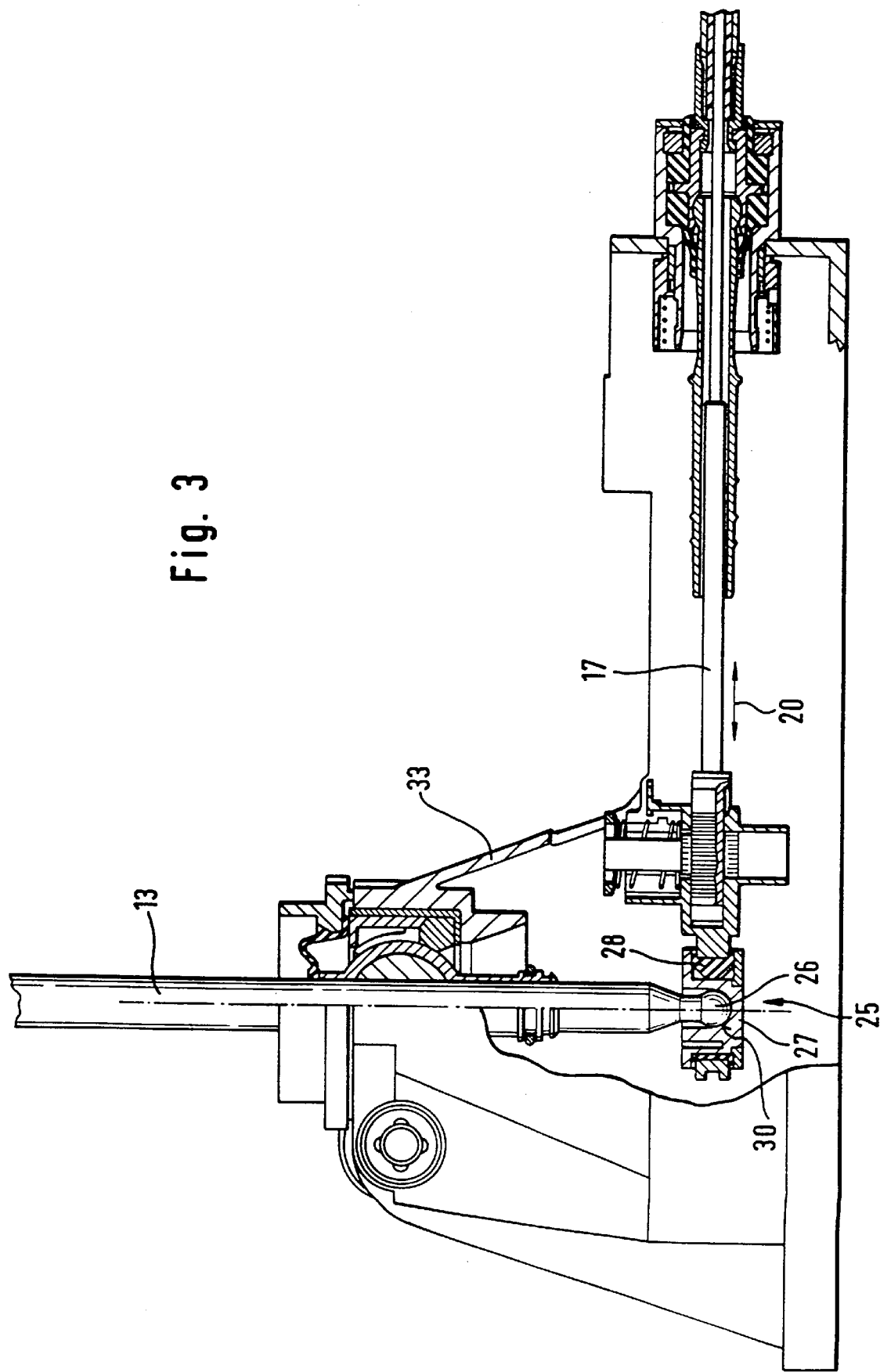
FIG. 3 shows a part of the shift device of the invention which has the manual shift lever, in a section in a vertical longitudinal plane of a gear-shift housing part.

A gear-shift housing part 10 is designed in the form of a closing cover with a central passage 6 for a gear-shift shaft 11 and with a bearing bracket 7 extending vertically downwards in the installation position. The gear-shift shaft 11 is mounted in the passage 6 and on the lower end of the bearing bracket 7, in each case by means of a rolling-bearing arrangement, so as to be rotatable and axially displaceable with respect to its axis of rotation 23—23 in relation to the gear-shift housing part 10. In the region of the bearing bracket 7, a shift finger 8 is provided for the actuation of shift rods, not illustrated in any more detail, which are used for actuating the conventional geared couplings for the respective coupling of a loose wheel to its transmission shaft.

For the engagement and disengagement of the gears (geared couplings), the shift finger 8 can be actuated by a shift lever 12 which is fixedly connected to the upper end 9 of the gear-shift shaft 11 and which has one half 16 of a joint 15 in the form of a spherical head which engages into the corresponding spherical socket 29 of the other half 18 of the joint 15 which is used for the articulation of a flexible shift cable 17 for transferring tensile and compressive forces to the shift lever 12. The shift cable 17 is induced by a manual shift lever 13 to execute engaging and disengaging movements according to the directional arrow 20, the shift cable 17 being connected to the joint half 18, there being interposed an annular damping member 19 which lies in the force flux of the shifting forces.

A boom 21, which at its free end holds an additional mass 14, is mounted, and supported by its weight, on a bearing 22 of the gear-shift housing part 10 so as to be pivotable about a pivot axis 24—24 parallel to the axis of rotation 23—23.

A link 31 is used for the kinematic connection of the shift lever 12 and boom 21, with a ball joint 32 being interposed in each case.

The manual shift lever 13 is connected to the shift cable 17 by means of a ball joint 25, of which one half 26 in the form of a spherical head is connected fixedly in terms of movement to the manual shift lever 13 and engages into the corresponding spherical socket 30 of the other joint half 27.

The manual shift lever 13 is mounted on a bearing block 33 in a known way pivotably about a first pivot axis, in such a way that these pivoting movements are converted into the engaging and disengaging movements 20 of the shift cable 17. The shift cable 17 is connected to the joint half 27, there being interposed an annular elastic damping member 28 lying in the force flux of the engaging and disengaging forces.

The shift finger 8, in order to be coupled to the respective shift rod, can be displaced in the longitudinal directions of the axis of rotation 23—23 by means of a double-armed selector lever 34 which is mounted on the gear-shift housing part 10 so as to be pivotable about a pivot axis 35—35 perpendicular to the axis of rotation 23—23.

One lever arm 36 of the selector lever 34 is likewise kinematically connected to the manual shift lever 13 by means of a joint, of which only a joint pin 38 is shown, via a flexible selector cable for the transmission of tensile and compressive forces.

The manual shift lever 13 is mounted on the bearing block 33 pivotably about a second pivot axis, in such a way that pivoting movements about the first pivot axis lead to the actuation of the shift cable 17 only, whereas, about the second pivot axis, they lead to the actuation of only the selector cable which is not illustrated in any more detail.

The second lever arm 37 of the selector lever 34 is connected to the gear-shift shaft 11 by means of a joint arrangement 39 which converts pivoting movements into reciprocating movements.

By virtue of this arrangement, both the additional mass 14 and the damping members 19 and 28 are brought into action solely on the shifting system for the engagement and disengagement of the gears, but are uncoupled completely from the selection system for selecting one of the shift rods (shift-gate slots) in each case.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Shift device for a gear-change transmission of a motor vehicle, comprising:

a gear-shift shaft which is arranged in a gear-shift housing so as to be rotatable and axially displaceable, a shift lever which is fixed in terms of rotation relative to the gear-shift shaft and which is kinematically connected to a manual shift lever, and an additional mass which acts on the shift lever and which increases the mass moment of inertia of the gear-shift shaft such that force peaks of the shifting force which is measurable on the manual shift lever are reduced during individual shifting operations, wherein the kinematic connection between the shift lever and the manual shift lever has a joint with a joint half assigned as part of the connection to the shift lever and with a joint half assigned as a further part of the connection to a linkage leading to the manual shift lever, and wherein one joint half is operatively connected to the part of the connection assigned thereto by means of an elastic damping member lying in the force flux of the shifting forces.

2. Shift device according to claim 1, wherein the kinematic connection between the shift lever and the manual shift lever has a joint with a joint half assigned as part of the connection to the manual shift lever and with a joint half assigned as a further part of the connection to a linkage leading to the shift lever, and wherein one joint half is operatively connected to the part of the connection assigned thereto by means of an elastic damping member lying in the force flux of the shifting forces.

3. Shift device according to claim 1, wherein a ball joint is used for the joint, and the joint half having a spherical socket is connected to the damping member.

4. Shift device according to claim 2, wherein a ball joint is used for the joint, and the joint half having a spherical socket is connected to the damping member.

5. Shift device according to claim 1, wherein a flexible cable for the transfer of tensile and compressive forces is used for the linkage.

6. Shift device according to claim 2, wherein a flexible cable for the transfer of tensile and compressive forces is used for the linkage.

7. Shift device according to claim 3, wherein a flexible cable for the transfer of tensile and compressive forces is used for the linkage.

8. Shift device according to claim 4, wherein a flexible cable for the transfer of tensile and compressive forces is used for the linkage.

9. Shift device for a gear-change transmission of a motor vehicle, comprising:

a gear-shift shaft which is arranged in a gear-shift housing so as to be rotatable and axially displaceable, a shift lever which is fixed in terms of rotation relative to the gear-shift shaft and which is kinematically connected to a manual shift lever, and an additional mass which acts on the shift lever and which increases the mass moment of inertia of the gear-shift shaft in such a way that force peaks of the shifting force which is measurable on the manual shift lever are reduced during individual shifting operations, the additional mass being connected to the gear-shift shaft, and being arranged in such a way that only the engaging movement is transferred to it, wherein the additional mass is arranged on a boom which is mounted pivotably on a housing part of the gear-shift housing at a distance from the axis of rotation of the gear-shift shaft and which is connected to the shift lever, wherein the pivot-bearing axis of the boom lies parallel to the axis of rotation of the gear-shift shaft, wherein the kinematic connection between the shift lever and the manual shift lever has a joint with a joint half assigned as part of the connection to the shift lever and with a joint half assigned as a further part of the connection to a linkage leading to the manual shift lever, and wherein one joint half is operatively connected to the part of the connection assigned thereto by means of an elastic damping member lying in the force flux of the shifting forces.

10. Shift device according to claim 9, wherein a link is used for the transmission connection between the shift lever, fixed in terms of rotation relative to the gear-shift shaft and the boom.

11. Shift device according to claim 9, wherein a ball joint is used for the joint, and the joint half having a spherical socket is connected to the damping member.

12. Shift device according to claim 9, wherein a ball joint is used for the joint, and the joint half having a spherical socket is connected to the damping member.

13. Shift device according to claim 10, wherein a ball joint is used for the joint, and the joint half having a spherical socket is connected to the damping member.

14. Shift device according to claim 9, wherein a flexible cable for the transfer of tensile and compressive forces is used for the linkage.

15. Shift device according to claim 11, wherein a flexible cable for the transfer of tensile and compressive forces is used for the linkage.

16. Shift device according to claim 12, wherein a flexible cable for the transfer of tensile and compressive forces is used for the linkage.

17. Shift device according to claim 13, wherein a flexible cable for the transfer of tensile and compressive forces is used for the linkage.

* * * * *